Figure 1:
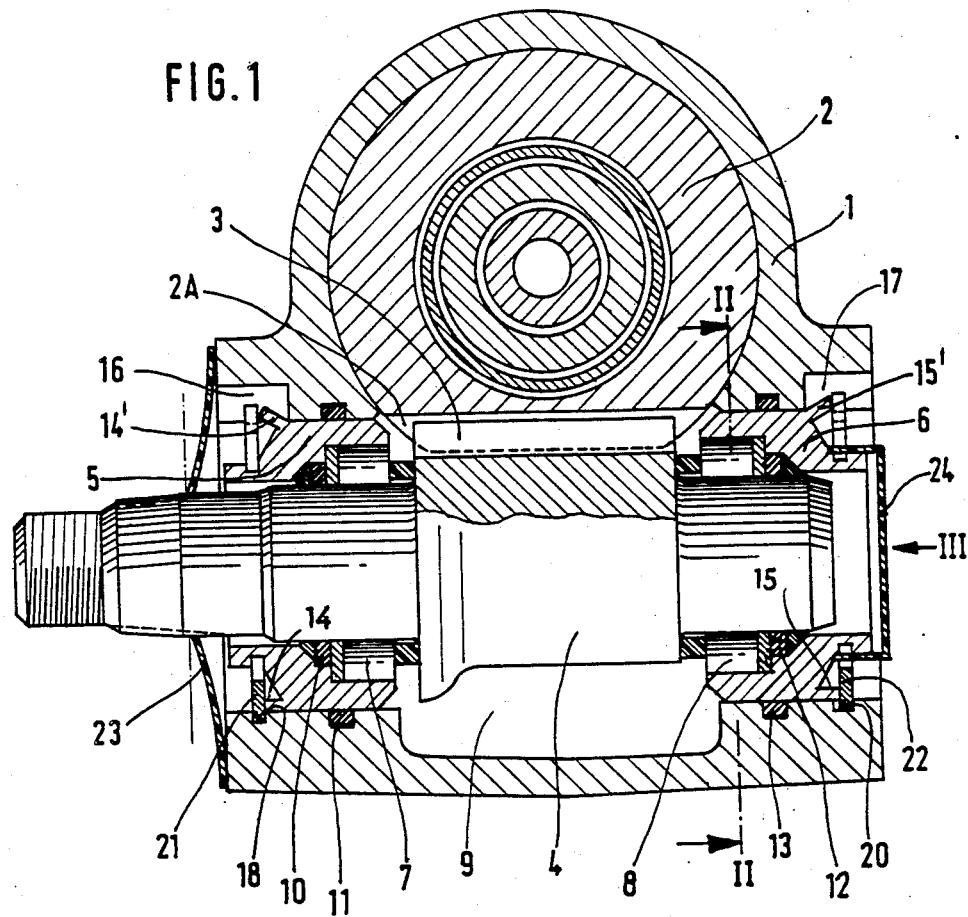

United States Patent [19]

Elser

[11] Patent Number: 4,614,127
[45] Date of Patent: Sep. 30, 1986

[54] STEERING GEAR

[75] Inventor: Dieter Elser, Essingen, Fed. Rep. of Germany

[73] Assignee: Zahnradfabrik Friedrichshafen, AG., Friedrichshafen, Fed. Rep. of Germany

[21] Appl. No.: 617,996
[22] PCT Filed: Aug. 3, 1983
[86] PCT No.: PCT/EP83/00207
§ 371 Date: May 29, 1984
§ 102(e) Date: May 29, 1984
[87] PCT Pub. No.: WO84/01550
PCT Pub. Date: Apr. 26, 1984

[30] Foreign Application Priority Data
Oct. 20, 1982 [DE] Fed. Rep. of Germany ....... 3238740

[51] Int. Cl.[4] .................. F16H 1/04; F16H 35/06; B62D 1/20
[52] U.S. Cl. ................................... 74/422; 74/498; 74/396
[58] Field of Search .............. 74/422, 498, 396, 395, 74/409

[56] References Cited
U.S. PATENT DOCUMENTS

| 2,251,167 | 7/1941 | Probst | 74/498 |
| 2,936,643 | 5/1960 | Smith et al. | 74/409 |
| 2,984,121 | 5/1961 | Folkerts | 74/498 |
| 3,241,386 | 3/1966 | Booth | 74/396 |
| 3,753,375 | 8/1973 | Colletti | 74/498 |
| 3,810,399 | 5/1974 | Schluckebier et al. | 74/409 |
| 3,954,016 | 5/1976 | Sarosy et al. | 74/422 |
| 4,218,933 | 8/1980 | Allen et al. | 74/422 |
| 4,224,833 | 9/1980 | Jablonsky | 74/422 |
| 4,307,622 | 12/1981 | Walter | 74/422 |
| 4,369,669 | 1/1983 | Allen | 74/422 |

FOREIGN PATENT DOCUMENTS

| 2409938 | 10/1974 | Fed. Rep. of Germany | 74/498 |
| 3017736 | 11/1981 | Fed. Rep. of Germany | |
| 1289815 | 9/1972 | United Kingdom | 74/498 |
| 2074693 | 11/1981 | United Kingdom | |

Primary Examiner—Kenneth J. Dorner
Assistant Examiner—Michael D. Bednarek
Attorney, Agent, or Firm—Zalkind & Shuster

[57] ABSTRACT

A rack and pinion gearing in a steering housing is provided, with eccentric bushing bearings at each end of the pinion shaft. The bushings are outer races of roller bearings which carry the shaft and which bushings are carried in the housing rotatively supported whereby rotation of each bushing serves to radially align the shaft in proper coaxial position in the assembly of the device, so that the rack and pinion teeth have accurate relative position. Thus, the eccentricity of the bushing bearings serves to shift respective ends of the shaft radially and the bearing bushings have relatively thin extending skirts which can be deformed so as to lock into notches in the housing when the pinion shaft is properly positioned.

4 Claims, 3 Drawing Figures

STEERING GEAR

BACKGROUND OF THE INVENTION

Steering gear of the kind described herein have heretofore been known, for example, in German OS 30 13 855. In the patent disclosure there is a steering nut rotated by a steering spindle for effecting an axial movement of a gear rack engaging a pinion sector on a shaft connecting with the front of a vehicle through a steering rod system. In order to adjust the teeth of the pinion sector with those of the rack, bearing bushings are used in an eccentric mount whereby rotation of the bushings adjusts the sector shaft for optional tooth engagement of the pinion with the rack. Subsequent to such adjustment, annular gaps between the housing and the bearing bushings are filled with a hardening liquid plastic to set the pinion sector shaft permanently in position. Cap members are secured by rings screwed to the housing.

Accordingly, the arrangement effects a solid support of the bearing bushings fixedly so as to absorb forces experienced on the sector shaft in the course of steering operation and driving of the vehicle.

The mode of securing the bearing bushings in adjusted position is reversible, that is, the bearing bushings can be loosened in order to replace sealing rings or roller bearings, but this can be accomplished only with a considerable expenditure of labor. Further, upon such loosening for the described purposes, reassembly requires rotation of the bearing bushings for readjustment once again.

BRIEF DESCRIPTION OF THE PRESENT INVENTION

The invention described herein is so constructed as to be economically favorable in manufacture, and once the adjustments have been made for proper positioning of the sector shaft, then disassembly can be made with reassembly not requiring any new adjustment.

The particular construction involves the use of bearing bushings having a circular exterior which is nonconcentric to the bore through which the sector shaft passes at each end of the shaft. The bearing bushings are carried in housing bores. Each such bushing, although of substantial body, has an extending rim or skirt thinned so that it can be radially deformed in any small portion around its periphery by means of a hammer or chisel.

The housing bores which carry the bearing bushings are provided with one or more notches into which a small portion of the skirt may be forcibly deformed after adjustment of the sector shaft has been made for optional tooth contact. In such manner, the bearing bushings are secured against any further rotation and the sector shaft is radially locked in place. Axial securing of the bearing bushings and those of the sector shaft is effected by split lock washers sometimes referred to as horseshoe clips. Thus, the clips are of conventional construction and applied or removed in a well known manner in order to remove the bearing bushings for servicing by seal replacement, etc. Reassembly requires only aligning the deformations in the bearing bushing skirts with the notches into which they were locked and pressing the bearing bushings into the respective housing bores. Accordingly, no repeat adjustment is necessary.

Figure 2:
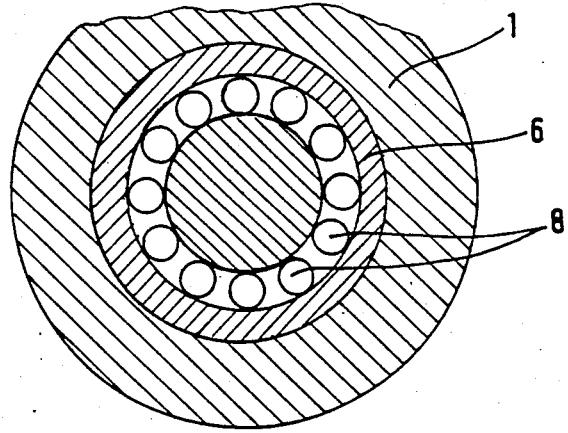
Figure 3:
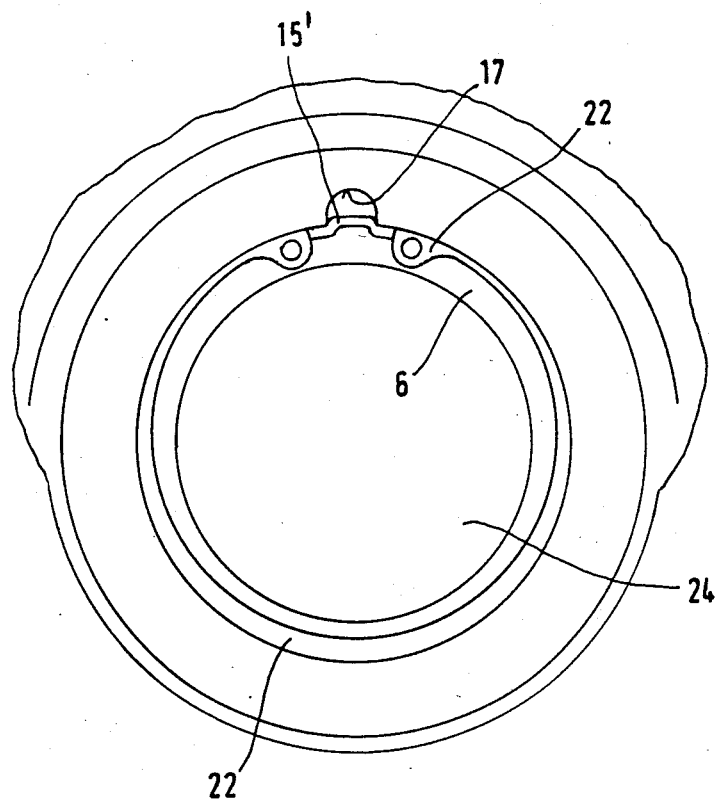

The invention will now be explained in detail in conjunction with the appended drawing, in which FIG. 1 shows a longitudinal section through a servo steering housing of the housing portion which has the sector shaft, FIG. 2 is a section on the line II—II of FIG. 1, FIG. 3 is a fragmentary end view showing a deformed portion of the thinned ring or skirt of a bearing bushing in locking engagement in a notch of the housing which carries the bushing.

Referring to the drawing, a steering housing 1 is shown having an operating power piston 2 with an integral rack having teeth 2A and which rack will be understood to be part of a conventional steering assembly comprising a steering nut and being shiftable in the housing. Thus, the piston 2 moves axially upon rotation of a steering spindle, as will be understood. Likewise of conventional construction, the rack teeth 2A engage the teeth 3 of a pinion sector on shaft 4.

The invention provides mounting of the sector shaft 4 at each end on eccentrically bored bearing bushings 5 and 6, whence the exterior of the bushings carried in bores of the housing will effect radial movement of the respective ends of the sector shaft when the bearing bushings are rotated for adjustment of the sector shaft.

The bearing bushings are outer races for roller bearings 7 and 8. As will be apparent, each roller bearing supports respective ends of the shaft.

Thus, it will be apparent that adjustment of relative tooth position by rotation of the bearing bushings can be effected.

The region 9 which would have oil under pressure is sealed as by sealing rings 10 and 11 at one side of the sector shaft and 12 and 13 at the other side.

Particular attention is directed to the novel radially thin skirts 14 and 15 which extend a short distance axially outward of respective bearing bushings 5 and 6. The housing bores which carry the bearing bushings are provided with at least one notch 16,17 on either side of the housing, and as will be seen by by comparing FIGS. 1 and 3, a small portion of the skirt 15 has been deformed into the notch 17. Thus, it will be understood that after the bearing bushings have been rotated so as to properly position the sector shaft for effecting correct contact of the pinion and rack teeth, forcible deformation as by percussion into notches 16 and 17 of a small portion of skirts 14 and 15 will lock the bearing bushings in rotative position. FIG. 1 shows the deformation portion 14' extending into notch 16 and deformation portion 15' extending into notch 17.

It will, of course, be apparent that several notches may be provided for several deformations of the skirts.

The bearing bushings 5 and 6 are held axially by locking members such as conventional split lock washers or U-clips having opening means such as open tops aligned with respective notches, through which tools can be inserted for deforming such portion or portions of the skirts which are to be wedged into a respective notch or notches. The clips are held in respective annular grooves 18 and 20 of the housing 1. As seen in FIG. 3, the fragmentary view shows the usual flanges at the open top of the clip 22 with apertures to receive a conventional pliers-like tool (not shown) that is used for squeezing the clip for insertion or removal into a respective groove.

Such clips are generally crescent shaped, being radially thin at the opening and large at the diametrically opposite portion, as will be understood from FIG. 1, whence the reference numerals 21 and 22 indicate a cross section at the bottom of the respective clips, which will be understood to taper to a thin section in the radial sense at the top openings.

The ends of the shaft are sealed against dust as by dust caps 23 and 24.

From the preceding discussion it will be apparent that each end of the sector shaft may be independently adjusted by its respective bearing bushing for an exact flush facing of the pinion and rack teeth in the direction of force transmittal as well as in the distance between the axis of the piston 2 and the sector shaft 4.

It will be readily apparent that by removal of the clips the entire sector shaft assembly may be removed and then reinserted after seal replacement or other servicing in the same position it was in, by virtue of the co-action of the deformed portions 14' and 15' with notches 16 and 17, respectively, or several deformations with respective notches.

I claim:

1. In a steering gear of the rack and pinion gear type having intermeshing teeth, means for adjustment of the rack and pinion gear teeth relative to each other wherein said pinion is on a sector shaft, said means comprising eccentric bushings supporting respective ends of said sector shaft and being adjustably carried rotatably in bores in a steering housing whereby rotation of said bushings effects radial adjustment of said sector shaft for adjustment of said rack and pinion teeth;

including securing means for securing said bushings in adjusted rotative position; the improvement wherein said securing means comprises deformable members on said bushings and notch means in said housing for receiving deformations of said deformable members in said notch means to secure said bushings in adjusted rotative position.

2. In a steering gear of the rack and pinion type, as set forth in claim 1, wherein said securing means comprise radially thin respective skirts extending axially from said bushings.

3. In a steering gear as set forth in claim 2, including a respective locking member locking each of said bushings in the housing and being disposed exteriorly of a respective skirt;

said locking members having opening means for providing access to a portion of the respective skirt to be deformed into respective notch means.

4. In a steering gear as set forth in claim 3, each said locking member comprising a U-clip having an opening;

said notch means comprising a respective notch in said housing aligned with an opening in a U-clip.

* * * * *